US 8,064,639 B2

United States Patent
Swaminathan et al.

(10) Patent No.: US 8,064,639 B2
(45) Date of Patent: Nov. 22, 2011

(54) MULTI-POSE FACE TRACKING USING MULTIPLE APPEARANCE MODELS

(75) Inventors: Gurumurthy Swaminathan, Bangalore (IN); Vijendran G. Venkoparao, Bangalore (IN); Rudra N. Hota, Jajpur (IN); Saad J. Bedros, West St. Paul, MN (US); Michal Juza, Lomnice nad Popelkou (CZ)

(73) Assignee: Honeywell International Inc., Morristown, NJ (US)

( * ) Notice: Subject to any disclaimer, the term of this patent is extended or adjusted under 35 U.S.C. 154(b) by 1145 days.

(21) Appl. No.: 11/780,238

(22) Filed: Jul. 19, 2007

(65) Prior Publication Data
US 2009/0022364 A1 Jan. 22, 2009

(51) Int. Cl.
*G06K 9/00* (2006.01)
(52) U.S. Cl. ........................................ 382/103; 382/162
(58) Field of Classification Search .................. 382/103, 382/104, 118, 117, 166, 190; 370/206; 348/333.11; 701/213
See application file for complete search history.

(56) References Cited

U.S. PATENT DOCUMENTS

| 6,810,144 B2 * | 10/2004 | McGee et al. ................. 382/166 |
| 7,627,178 B2 * | 12/2009 | Suzuki et al. ................. 382/190 |
| 2004/0081074 A1 * | 4/2004 | Piechocki ..................... 370/206 |
| 2006/0044446 A1 * | 3/2006 | Porter et al. ............. 348/333.11 |
| 2006/0224318 A1 * | 10/2006 | Wilson et al. ................. 701/213 |
| 2010/0316298 A1 | 12/2010 | Swaminathan et al. |

OTHER PUBLICATIONS

"British Application Serial No. 1009566.9, Office Action mailed Sep. 20, 2010", 5 pgs.
"Joint Probabilistic Data Association Filter", Wikipedia®, the free encyclopedia, [online]. [retrieved Sep. 24, 2010]. Retrieved from the Internet: <http://en.wikipedia.org/wiki/Joint_Probabilistic-Data-Association-Filter>, (updated Feb. 27, 2009), 1 pg.
Rasmussen, C., et al., "Probabilistic Data Association Methods for Tracking Complex Visual Objects", *IEEE Trans on Pattern Analysis and Machine Intelligence*, 23(6), (Jun. 2001), 560-576.
Swaminathan, G., et al., "Multiple View Face Tracking", U.S. Appl. No. 12/482,350, filed Jun. 10, 2009, 50 pgs.

* cited by examiner

*Primary Examiner* — Vu Le
*Assistant Examiner* — Claire X Wang
(74) *Attorney, Agent, or Firm* — Schwegman, Lundberg & Woessner, P.A.

(57) ABSTRACT

A system and method are provided for tracking a face moving through multiple frames of a video sequence. A predicted position of a face in a video frame is obtained. Similarity matching for both a color model and an edge model are performed to derive correlation values for each about the predicted position. The correlation values are then combined to determine a best position and scale match to track a face in the video.

16 Claims, 7 Drawing Sheets

305 – For each track
    310 – Obtain the predicted position of the face
    315 – If (predicted position is out of frame)
        delete the track
        continue
    end
    320 – Search for best match around the predicted position
end
325 – Associate the detections with the tracks based on the overlap between
    the position of the best match and the position of the detection
330 – If (more then one track is associated with a detection)
    remove the associations except the one that has the best
    overlap
end
335 – for each (detection not associated with any track)
    start a new track on the detection
end
340 – If (track is not associated with detections AND
    track has lived for less than 2 frames)
    delete the track

FRAME 13

FRAME 20

FRAME 27

FRAME 33

FRAME 46

FRAME 66

FRAME 89

FRAME 100

*FIG. 7*

FRAME 5

FRAME 8

FRAME 14

FRAME 15

FRAME 17

FRAME 18

MULTI-POSE FACE TRACKING USING MULTIPLE APPEARANCE MODELS

BACKGROUND

Tracking faces in a video sequence is an important module for automated video surveillance. It is a precursor to many applications such as video based face recognition, tag and track of faces and multi-camera indexing. Face tracking in a video has been a long studied problem using many features, such as skin color and edge based face structure features. Tracking faces poses unique set of problems when compared with tracking other objects, such as people, cars, or other objects of interest.

Faces are approximately uniform in their color which makes the tracking solution possible using color as an appearance model. Many researchers have used features derived from the skin color of the face, such as color histogram, for face tracking. Using the face color as an appearance model for tracking provides invariance to different head pose variations. However, the problem of face tracking using color is challenging when the background is of similar color or in the presence of ambient illumination variations. Using edge information of faces as an appearance model for face tracking proved robust to illumination variations. However, the out-of-plane variations of the face pose worsens 2D edge model matching. A generalized tracking algorithm has also been used that models the appearance using a mixture of Gaussians. It may be used for tracking a face with pose changes, typically in-plane pose changes. Others may use an appearance model and embed the tracking in the particle filter framework.

Two main approaches have been used to track faces in videos. In one approach, local features of the face are detected (or manually marked) and the features are tracked over time. This is useful if the orientation of the face needs to be computed along with the face position (as used in Human Computer Interaction applications). Another approach utilizes global features of the face, such as a color histogram, that distinguishes the face from the background.

In surveillance videos, multiple faces need to be tracked with face sizes as small as 24×24 pixels, making it difficult to identify and track local features. The faces can undergo illumination changes (because of shadows and indoor lighting), can have partial occlusions, and have large pose changes. The background may also be cluttered, depending on the setup. These challenges need to be overcome for effective face tracking in a surveillance setup.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software, hardware and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method are provided for tracking a face moving through multiple frames of a video. A predicted position of a face in a video frame is obtained. Localized search for both a color model and an edge model are performed to derive similarity values, represented as correlation values, for each position in the search area defined around the predicted position. The correlation values are then combined to determine a best position match to track a face in the video.

In the description, multiple independent appearance models used for face representation are first described, followed by a method of predicting the position of a face. Finally, methods of combining the results of the models to track the face are described.

In one embodiment, representations from an edge representation and a color representation for a face appearance model are combined to track faces. The color representation in one embodiment is a YCbCr color space of an input image. The edge representation in one embodiment is the output of a Difference of Gaussian (DOG) filter on a grayscale input image. The two models are independent in one embodiment, and may be used to represent the appearance of a face, and track it over multiple frames of a video. In one embodiment, each model provides correlation values that may be combined by multiplication to provide a final correlation matrix which may be used for tracking.

Figure 1A:
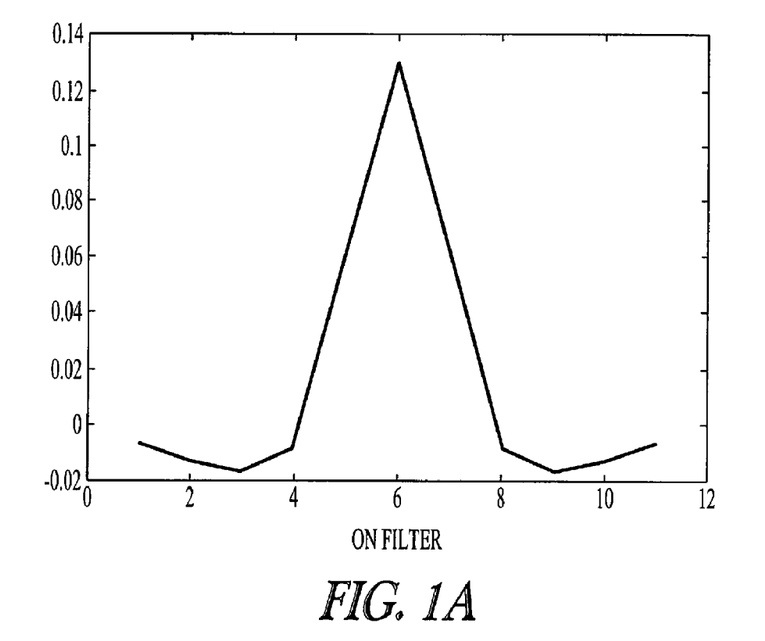
FIGS. 1A and 1B are graphs illustrating difference of Gaussian (DOG) filter models according to an example embodiment.
Figure 1B:
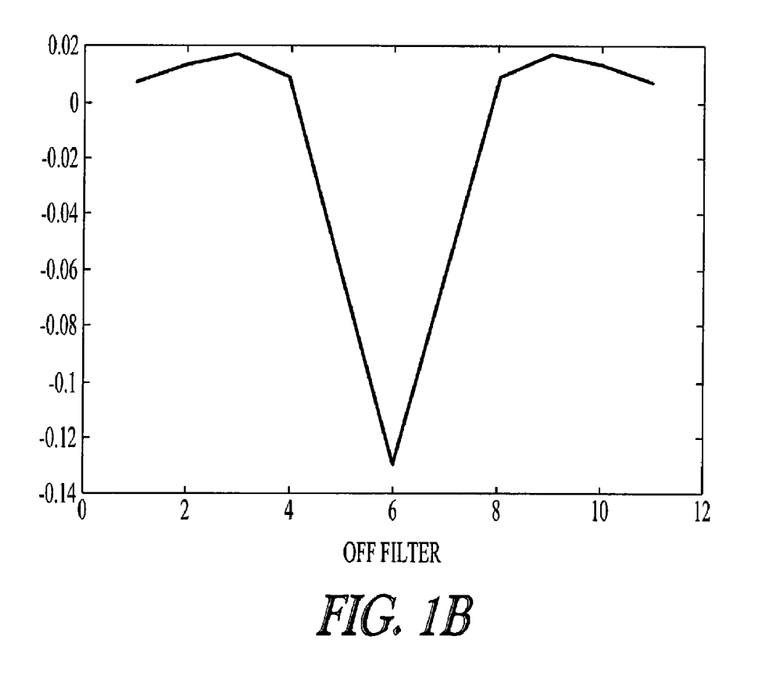

DOG filters as illustrated in FIGS. 1A and 1B. FIG. 1A illustrates a response of an on-center, off surround filter, and FIG. 1B illustrates the response of an off-center, on surround filter. A DOG filter has a response that is high around the edges of the image, i.e., where there are variations in intensity, and low (or zero) over uniform regions. In one embodiment, the DOG filter may be referred to as an edge based model or face sketch. Even though responsive to edges, DOG filters are un-oriented filters and hence are not sensitive to orientation. Cells with such properties have been found in the Lateral Geniculate Nucleus (LGN) layer of the human visual system, which is the first stage of visual processing. Such filters have contrast normalization properties which help in dealing with illumination changes. DOG filters have also been shown to be useful for face recognition. DOG filters provide good recognition rate and may be resistant to slight pose changes.

For the edge based model, the output of Difference of Gaussians (DOG) on the grayscale face image is used. There are two types of filters, on-center off-surround and off center, on-surround. Though, the output of one filter is sufficient to obtain the output of another (basically the output of off-center is the negative of the on-center output), two filters are used so that the representation of the appearance model is positive. In one embodiment, the positive kernel is defined and the negative output may be obtained by negative of the ON output before thresholding. The DOG is defined as:

$$ON(x, y) = \frac{1}{\sqrt{2\pi}\sigma_c} e^{-\frac{(x^2+y^2)}{2\sigma_c^2}} - \frac{1}{\sqrt{2\pi}\sigma_s} e^{-\frac{(x^2+y^2)}{2\sigma_s^2}}$$

where, $\sigma_c$ (3) is the standard deviation for the center Gaussian and $\sigma_s = K \sigma_c$ is for the surround Gaussian, where K is a constant. The DOGs are normalized such that the sum of the positive values equals 1 and the sum of negative values equals 1. This results in zero response for uniform regions. Using the center surround filters we obtain two set of features:

ONOUT=ON*I

OFFOUT=−ONOUT

FONOUT=[ONOUT]$^+$

FOFFOUT=[OFFOUT]$^+$ where $[x]^+ = x, x > 0$, 0 otherwise

Figure 2A:
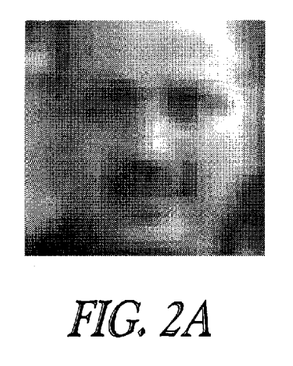
FIGS. 2A, 2B and 2C illustrate the output of the filters of FIGS. 1A and 1B for a face according to an example embodiment.
Figure 2B:
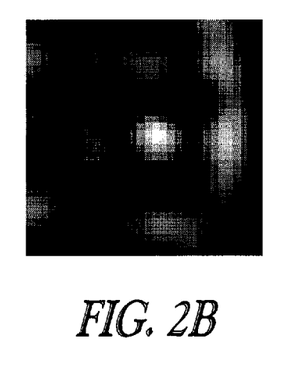
Figure 2C:
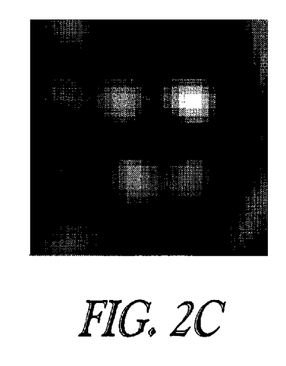

FIGS. 2A, 2B and 2C illustrate the output of the DOG filter. FIG. 2A is the input image. FIG. 2B is the ON filter output and FIG. 2C is the OFF filter output.

Color template appearance models are basically snapshots of the objects in an appropriate color space. In one embodiment, the YCbCr color space is used for representing the face. YCbCr color space may be more discriminative than other color spaces between skin and non-skin pixels. The YCbCr space may be created by converting RGB space to YCbCr space using various conversion functions. Representing the face in such a space may provide maximal separation between face and non-face pixels and hence help to track the face better. In one embodiment, illumination and pose changes are handled by combining results from the DOG and color template appearance models. Using both models and combining them facilitates tracking faces reliably in surveillance videos under head pose and ambient light illumination variations.

Figure 3:
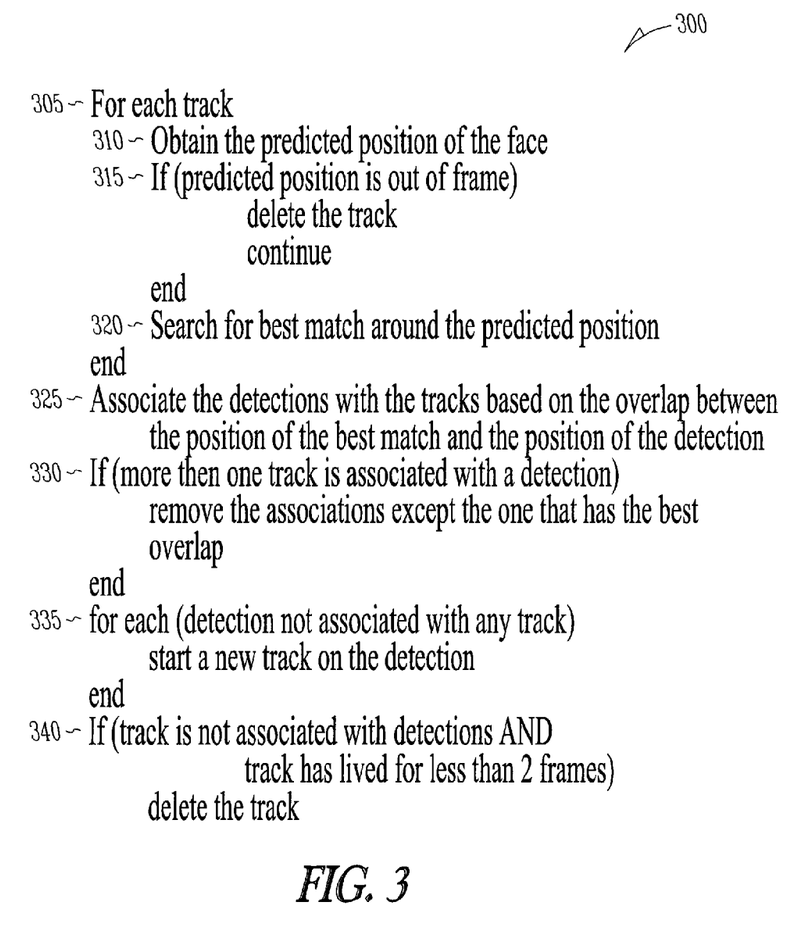
FIG. 3 is a pseudocode representation of predicting positions of a face in tracks according to an example embodiment.

An overall computer implemented method 300 for tracking faces is illustrated in a pseudocode in FIG. 3. The face tracking method 300 uses detections from a face detector and tracks the face over time. An input for method 300 is a set of detections from each model for a particular frame of video.

For each track of video, as indicated at 305, a predicted position of the face is obtained at 310. If the predicted position is out of frame, the track may be deleted at 315. At 320, the best match around the predicted position is found.

At 325, detections with the tracks are associated based on an overlap between the position of the best match and the position of the detection. If more than one track is associated with a detection at 330, associations other than the one that has the best overlap are removed.

At 335, for each detection that is not associated with a track, a new track is started on the detection. If a track is not associated with detections and the track has lived for less than two frames, it may be deleted at 340.

A particle filter in one embodiment is used to provide the prediction of the position of the track over time. Other filters may be used in further embodiments. Four states of a face may be tracked in one embodiment. They are top-left position (x, y) and velocity (vx, vy). A weight for each particle is also maintained. For each track, the following variables are maintained:

1. $p_i^x(t)$—top-left x position of the particle i at time t
2. $p_i^y(t)$—top-left y position of the particle i at time t
3. $p_i^{xv}(t)$—velocity in x direction of the particle i at time t
4. $p_i^{yv}(t)$—velocity in $y$ direction of the particle i at time t
5. $wt_i(t)$—weight for particle i at time t When a face is detected by the detector, a new track is created and the corresponding particles are initialized. Each track is initialized with a set of 1000 particles with an initial constant velocity of 1 and the position of the particles distributed around the top-left position of the detected face. In one embodiment, 1000 particles are provided with an initial position around the top-left corner of the detected face, and the initial weight set to a constant $$p_i^x(1) = obs^x + \sigma * G(i)$$

$$p_i^y(1) = obs^y + \sigma * G(i)$$

$$p_i^{xv}(1) = X_{VEL} + \sigma * G(i)$$

$$p_i^{yv}(1) = Y_{VEL} + \sigma * G(i)$$

$$wt_i = \frac{1}{N}$$

where $obs^x(t)$, $obs^y(t)$ is the observed (x, y) position (from the face detector) of the track at time $t$, $X_{VEL}$, $Y_{VEL}$ is the initial velocity, G(i) is a Gaussian random number, σ is the variance, and N is the number of particles. The particles would be distributed around the detected position depending on σ. σ is set to 2 in one embodiment of the tracker.

For any time t the prediction of the position from the particle filter is obtained as follows:

$$\hat{x} = \frac{1}{N} \sum_i p_i^x$$

-continued $$\hat{y} = \frac{1}{N} \sum_i p_i^y$$

Figure 4:
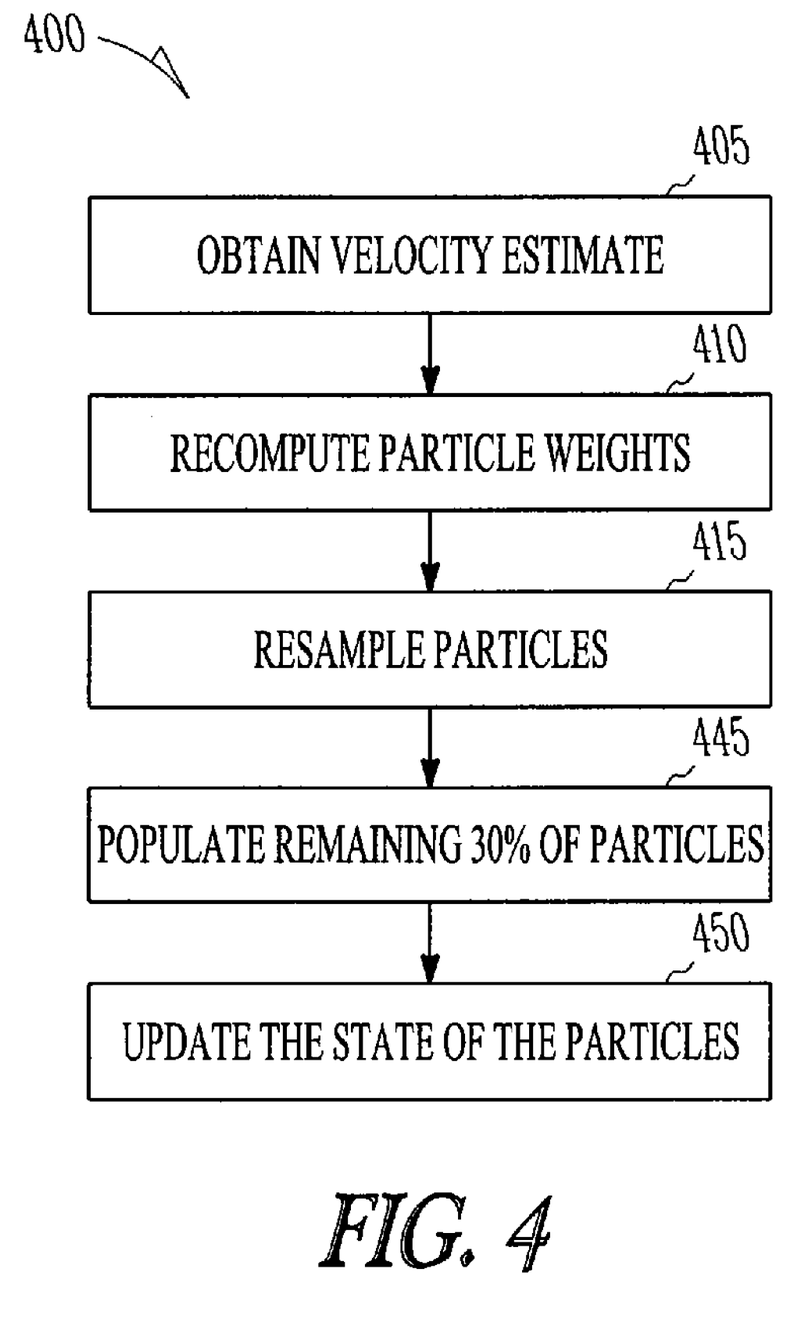
FIG. 4 is a flowchart with pseudocode illustrating a method of updating a particle filter according to an example embodiment.

The particle filter is also updated at various times as illustrated at 400 in FIG. 4. Let the observed position (either from detection or the obtained by search) be obs$^x$(t), obs$^y$(t). The velocity estimate may be obtained at 405 by obs$_v^x$(t)=obs$^x$(t)−obs$^x$(t−1) and obs$_v^y$(t)=obs$^y$(t)−obs$^y$(t−1)

The following steps are used to update the particle filter: Recompute the weights of the particles at 410 based on the observation:

$$wt_i = \exp\left(-0.5 * \left(\frac{(p_i^x - obs^x)^2 + (p_i^y - obs^y)^2}{\sigma_d} + \frac{(p_i^{xv} - obs^{xv})^2 + (p_i^{xv} - obs^{xv})^2}{\sigma_{dv}}\right)\right)$$

where $\sigma_d$ and $\sigma_{dv}$ are for position and velocity respectively. This determines the distribution of the weight values across the particles.

The particles are resampled at 415 based on the weights. Around (50+P) % of the new particles are generated by resampling the original set of particles based on their weights, where P ranges from 0 to 50. A sampling with replacement algorithm may be used to resample the particles.

The remaining (50−P) % of the particles may be populated using the observation at 445. These particles would have their states distributed around the observation, just like in the initialization. The state of the particles is then updated at 450. In one embodiment, the state of the particles are updated using:

$$p_i^x(t+1) = p_i^x(t) + p_i^{xv}(t) + \sigma * G(i)$$
$$p_i^y(t+1) = p_i^y(t) + p_i^{yv}(t) + \sigma * G(i)$$
$$p_i^{xv}(t+1) = p_i^{xv}(t) + \sigma * G(i)$$
$$p_i^{yv}(t+1) = p_i^{yv}(t) + \sigma * G(i)$$
$$wt_i = \frac{1}{N}$$

where σ is a constant.

Figure 5:
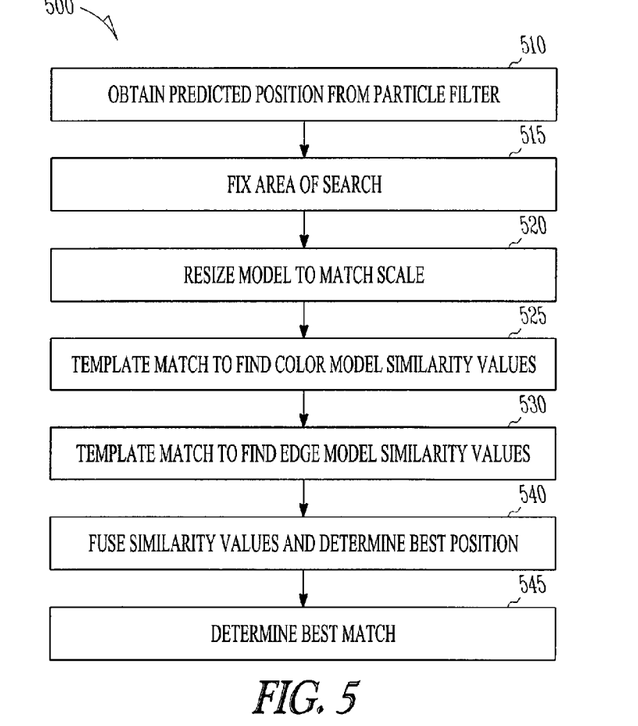
FIG. 5 is a flowchart representation of a method of tracking a face using multiple models according to an example embodiment.

A search may be performed to find the best match as illustrated in FIG. 5 at 500. In order to find the location of the track in the current frame, a search using the appearance model around the predicted position is done in one embodiment to find the best match which is then used to update the appearance model.

Figure 6:
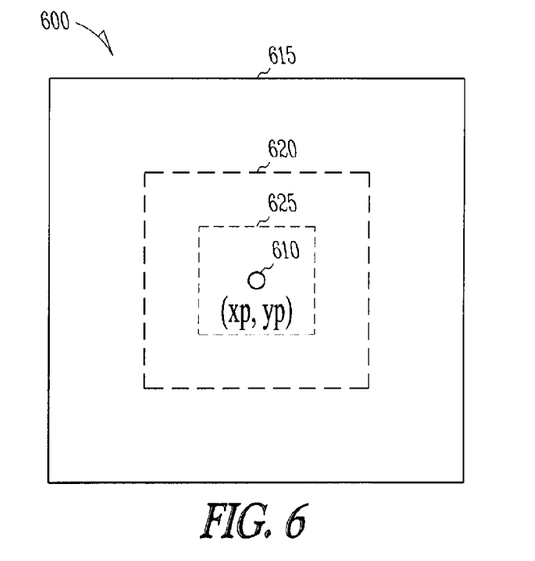
FIG. 6 is a block representation of a predicted position according to an example embodiment.

At 510, the predicted position is obtained from the particle filter (x, y). At 515, the area of search is fixed to be (x$_1$, y$_1$, x$_2$, y$_2$) where, $x_i$=x−appModelWidth $y_1$=y−appModelWidth $x_2$=x+appModelHeight $x_2$=y+appModelHeight That is, the area of search is twice the size of the appearance model. The size of the search area is determined by the face motion dynamics and also by tracking accuracy. If the search area is large, then the face is likely to be within the search area and hence the search mechanism is more likely to locate the face correctly. On the other hand, if the search area is large, then the time taken to perform the search becomes more, leading to reduction in computational speed. Hence, the search area is determined based on the scene and face dynamics. For scale=1−p,1,1+q, where p and q are constants that are optimized based on face motion, the appearance model may be resized to match the scale at 520. At 525, $\hat{C}$=correlation values are obtained by template matching within the search area for color template appearance model. $\hat{D}$=correlation values are obtained at 530 by template matching within the search area for DOG appearance model. The correlation values are then multiplied at 540, $\hat{F}=\hat{C}*\hat{D}$ where $\hat{F}$ is the final correlation value matrix. Also at 540, the best position for scale s is ($x_b^s$, $y_b^s$)=argmax$_{x,y}$(F) with correlation value $V_s$. Out of three positions the best one is chosen based on the maximum correlation value. ($x_b$, $y_b$)=argmax$_s$ $V_s$ The best match is searched for at 545. FIG. 6 is a graphical representation of the search for the best match at 600. x , y at 610 indicates the predicted position. Solid line 615 indicates the frame, dashed line 620 indicates the search area and dotted line 625 indicates the size of the appearance model.

The correlation values obtained by search using the two appearance models are multiplied to obtain the final correlation matrix as indicated above at 540. The final correlation matrix is then used to find the best match position at 545. Multiplication ensures that the final best position is the one that has high correlation value for both the appearance models. One interesting aspect of this approach is that the range of the correlation values is different for each appearance model. For example, the range for color template appearance model in one embodiment is from 0.96 to 1 while the range for DOG appearance model is from 0.3 to 1. Because of the difference in range the final position estimate may be influenced heavily by the DOG appearance model. In one embodiment, the correlation values are normalized prior to multiplication. In further embodiments, the correlation values are weighted such that correlation values of models that match detected video conditions are more heavily weighted.

The predicted position from the particle filter gives an approximate location of the track. The dimension of the face (width, height) is obtained from the appearance model. When the face is detected, the width and height provided by the face detector may be used to construct the appearance model. After that, the face is searched across scale space to determine the appropriate width and height. From the predicted position, a search area is constructed If the tracker loses a face then it may be difficult for the tracker to reacquire the face since the estimated position heavily influences the predicted position (since the latest observation is incorporated into the framework). Thus the particle filter framework in one embodiment, maintains multiple distributions of particles. In one embodiment, a boosted particle filter uses AdaBoost (adaptive boost—modifying a classifier in favor of instances misclassified by previous classifiers) detections to form part of the proposal distribution. In particular, based on a parameter, some particles may be sampled from proposal distributions based on AdaBoost detections and some are sampled based on state estimates. This helps the tracker to rely both on state estimates and AdaBoost detections, thus complementing each other. In particular, even though some particles are distributed based on the wrong estimate, some others are still distributed based on the detection (which is assumed correct) and hence the tracker would be able to reacquire the track.

In a typical surveillance video, the face may not be detected when it first appears in the scene. This may be due to the quality of the face image such as the size of the face (smaller than the minimum size that can be detected) or the illumination conditions. Hence, the face may be detected only after some frames in the scene. In order to establish the full track of the face, the tracker traces back the face starting from the frame where it was detected and going backwards in time up to the point where it can be reliably tracked. Even though the track is traced only after the face has moved past the frames, the information is used later for better description of where the person was.

Backtracking is achieved in a similar manner as normal tracking (which is described before) except that the frames are run backwards. Thus, the additional task can be achieved within the existing framework. Even though the track trace cannot be viewed in real time, it is used for forensic analysis.

Figure 7:
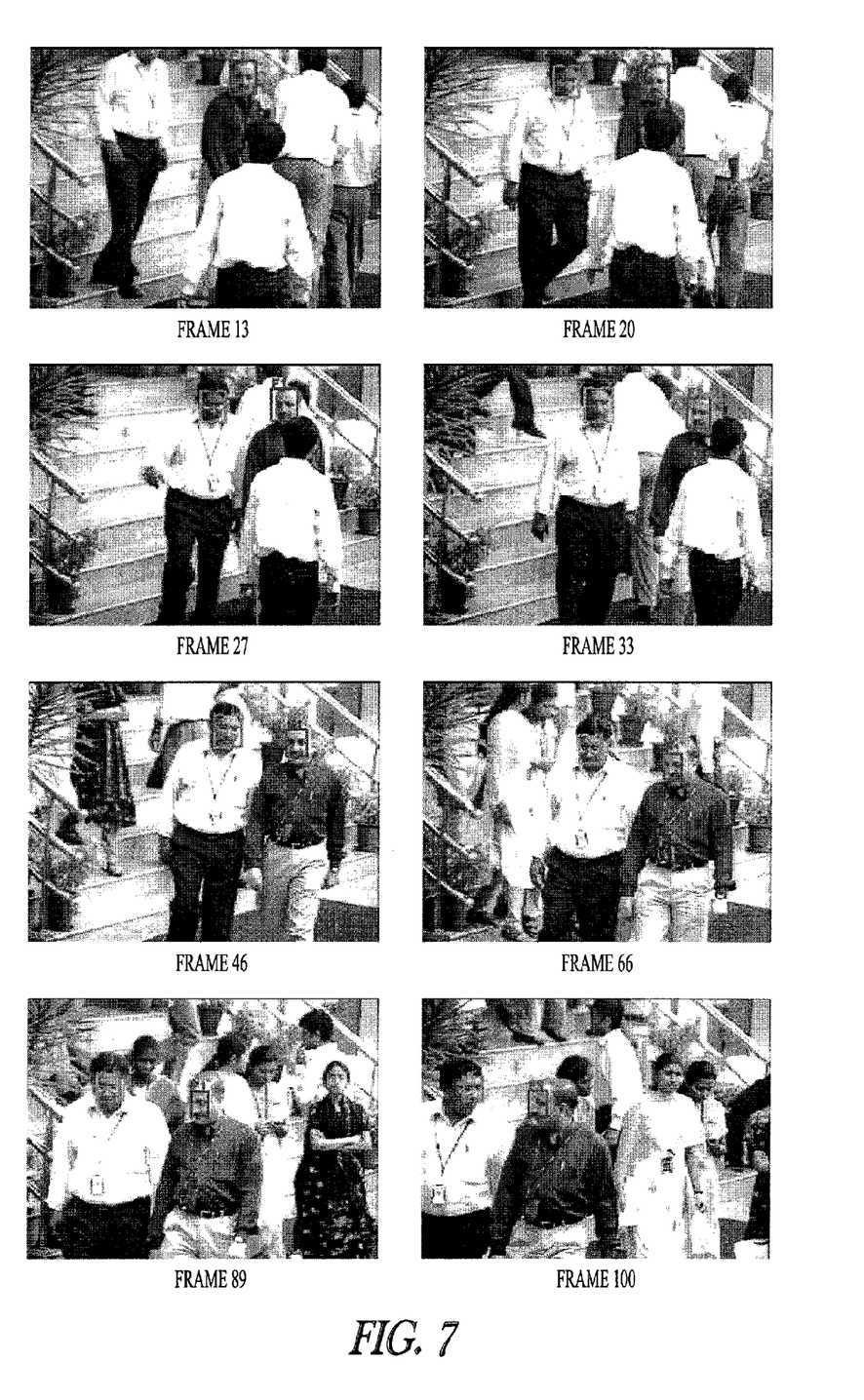
FIG. 7 is a series of frames from a surveillance video illustrating face tracking between the frames according to an example embodiment.

An example with a realistic surveillance video with multiple people walking and complex backgrounds is illustrated in several frames of a video in FIG. 7. Initially, faces in the video are tagged (detected) by means of the face detector, and then the tagged faces are tracked. The output of the tracker is shown for several frames in FIG. 7. Two faces are tracked in the sequence of video images. The faces are identified with squares drawn around them. Other attributes may be used to identify the faces, such as highlighting. A person in a dark shirt in Frame 13 is so indicated, along with a person immediately to the left of him in Frame 20. As seen in subsequent frames, the tracker was able to track both people consistently despite various pose changes, including rapid changes over time as they reached the bottom of the stairs and turned, as the person in the dark shirt turned his head in Frame 100. Note that the scale also changed as they walked toward the camera.

Figure 8:
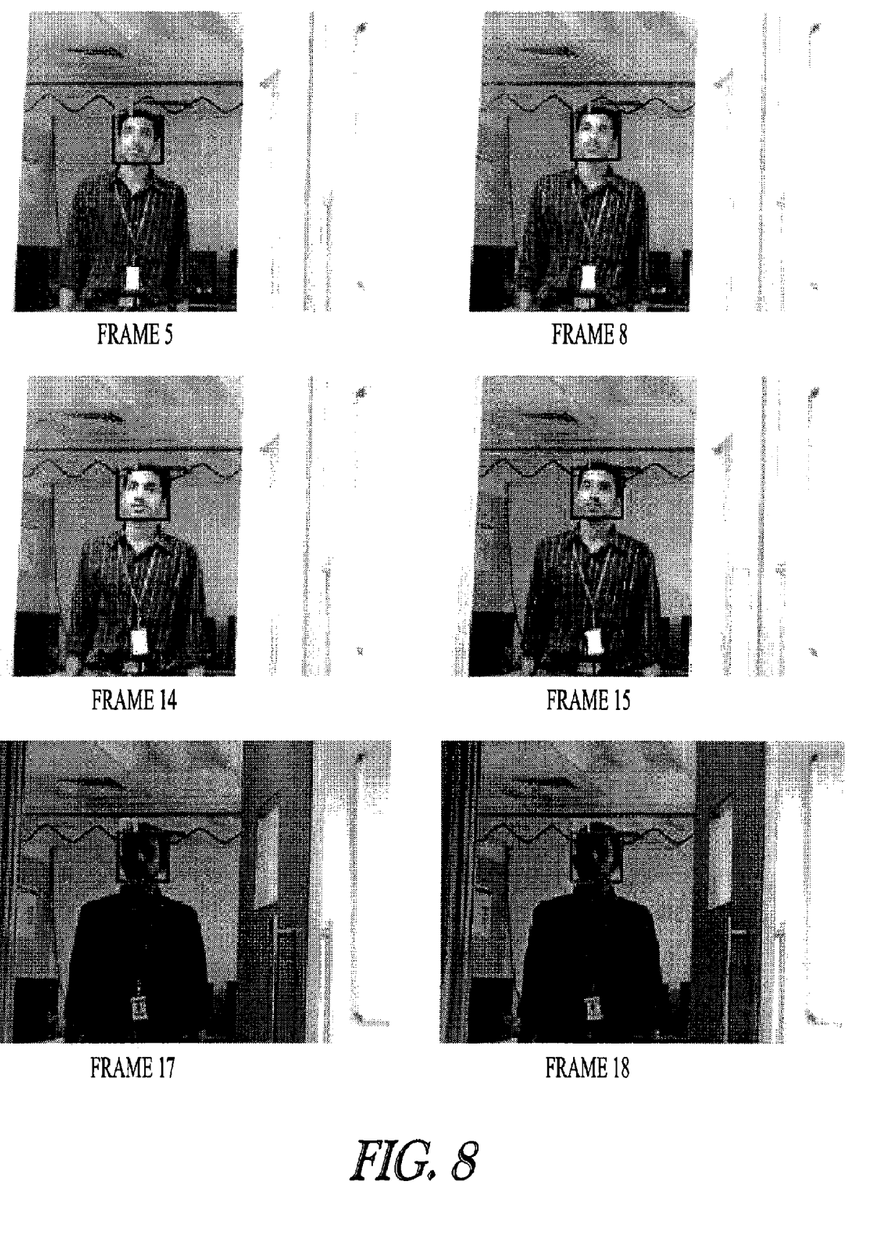
FIG. 8 is a series of frames from a surveillance video illustrating face tracking between the frames with illumination change according to an example embodiment.

FIG. 8 show several frames which illustrate the handling of illumination changes. The illumination changes drastically between Frame 15 and Frame 17, from light to dark. A color template appearance model used alone would lose tracking with such an illumination change. However, the combined models of color template plus DOG appearance model performs better. The person is tagged and tracked over Frames 5 to 18. As the light changes, the track is still maintained.

Figure 9:
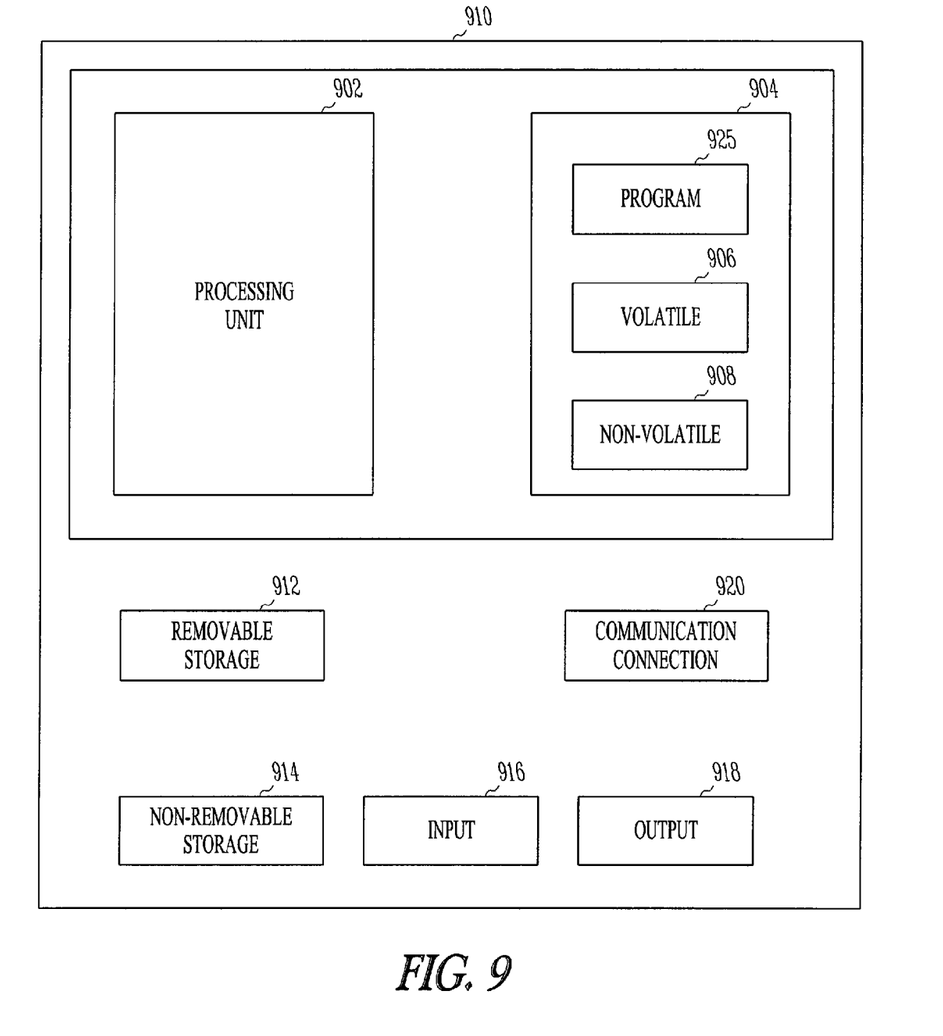
FIG. 9 is a block diagram of a typical computer system used to implement methods according to an example embodiment.

A block diagram of a computer system that executes programming for performing the above algorithms and methods is shown in FIG. 9. A general computing device in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, as well as data, including video frames. Computer 910 may include or have access to a computing environment that includes input 916, output 918, and a communication connection 920. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium.

A robust face tracking system tracks faces under varying illumination and head pose changes is presented. The system may handle illumination changes by means of combining multiple appearance models. It can also handle both in-plane and out-of-plane pose changes reliably. DOG filters are used to generate appearance models for the face. The appearance models are combined with a color appearance model to obtain robust tracking of a face through illumination, pose and scale changes The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method of tracking a face moving through multiple frames of a video sequence, the method comprising:
  receiving into a computer processor a predicted position of a face in a video frame;
  performing a search using the computer processor to determine color model similarity values around the predicted position of the face in the video frame;
  performing a search using the computer processor to determine edge model similarity values around the predicted position of the face in the video frame; and
  combining the color model similarity values with the edge model similarity values using the computer processor to determine a best match to track a face in the video;
  wherein similarity values represent correlation values between two data blocks; and
  wherein combining the color model similarity values with the edge model similarity values comprises multiplying the color model similarity values with the edge model similarity values.

2. The method of claim 1 wherein the correlation values are normalized prior to combining.

3. The method of claim 2, wherein the normalization is done using predefined mean and variance, or computed minimum and maximum, or computed mean and variance of the correlation values.

4. The method of claim 1 wherein the edge model comprises a difference of Gaussians (DOG) model, or comprises of Laplacian of Gaussians (LOG) model.

5. The method of claim 4 wherein the DOG or LOG models comprise a DOG or LOG filters that has a high response around edges of an image.

6. The method of claim 1 wherein a YCbCr color space is used to represent faces in the color model.

7. The method of claim 1 wherein a particle filter is used to obtain a predicted position of a face in a video frame.

8. The method of claim 1 and further comprising tracking the face backwards, starting from the frame where the face was detected, until the face moves out of the frame, so as to construct a full track of the face.

9. A tracker for tracking faces in surveillance video frames, the tracker comprising:
  a position predictor that provides a predicted position of a face in a video frame;

a color model that provides color model similarity values around the predicted position of the face;

an edge model that provides edge model similarity values around the predicted position of the face; and means for combining the color model similarity values with the edge model similarity values to determine a best match around the predicted position to track a face in the video;

wherein the means for combining the color model similarity values with the edge model similarity values multiplies the color model similarity values with the edge model correlation values.

10. The tracker of claim 9 wherein the similarity values are normalized prior to multiplying.

11. The tracker of claim 9 wherein the edge model comprises a difference of Gaussians (DOG) model.

12. The tracker of claim 11 wherein the DOG model comprises a DOG filter that has a high response around edges of an image.

13. The tracker of claim 9 wherein a YCbCr color space is used to represent faces in the color model.

14. The tracker of claim 9 wherein the face is scaled for the color model as the face moves through frames of video.

15. The tracker of claim 9 wherein a particle filter is used to obtain a predicted position of a face in a video frame.

16. The tracker of claim 15 wherein the particle filter is updated using a uniform distribution of random numbers.

* * * * *